United States Patent [19]

Querry

[11] 4,174,505
[45] Nov. 13, 1979

[54] DIRECTIONAL PSK MODULATION AND DEMODULATION SYSTEM

[75] Inventor: Lester R. Querry, Laurel, Md.

[73] Assignee: Digital Communications Corporation, Gaithersburg, Md.

[21] Appl. No.: 900,535

[22] Filed: Apr. 26, 1978

[51] Int. Cl.² ............... H04L 27/20; H04L 27/22
[52] U.S. Cl. ............... 332/9 R; 332/16 R; 329/107; 329/122; 329/137; 329/154; 325/30; 325/163; 325/320; 325/346; 325/349
[58] Field of Search ............... 325/30, 38 R, 45, 143, 325/145, 163, 164, 320, 321, 346, 349, 487; 332/9 R, 9 T, 14, 16 R, 16 T, 29 R, 30 V; 329/102, 103, 107, 110, 122, 124, 137, 145, 150, 153, 154

[56] References Cited

U.S. PATENT DOCUMENTS 3,492,576   1/1970   Warters ............... 325/30

*Primary Examiner*—Siegfried H. Grimm
*Assistant Examiner*—E. Westin
*Attorney, Agent, or Firm*—Pollock, Vande Sande & Priddy

[57] ABSTRACT

A direction phase shift keyed communication system provides the capacity to transmit any one of two symbols for each modulation level. The modulator produces a substantially constant frequency signal which includes a phase transistion in respect of each information bit. In a system with a single modulation level, corresponding to a phase transistion $\phi$, one of the two symbols is represented by a phase transition $+\phi$, i.e., an advancing phase transition. The other symbol is represented by a phase transition $-\phi$, i.e., a retarding phase transition. A demodulator responds to a substantially constant frequency signal with a phase transition included, and produces an output signal of a first kind in response to an advancing phase transition $+\phi$ and an output signal of a second kind in response to a retarding phase transistion $-\phi$. The system is capable of operating with multiple modulation levels, each of which can represent any one of two symbols, depending on the sense, i.e., advance or retad, of the transistion. Preferably, each modulation level is 180° or a multiple thereof.

18 Claims, 15 Drawing Figures

BIPHASE PSK
PRIOR ART

DIRECTIONAL
BIPHASE PSK

DIRECTIONAL
UNIPHASE PSK

DIRECTIONAL PHASE MODULATOR (ANALOG)

FIG 7
TIMING DIAGRAM FOR FIG. 6
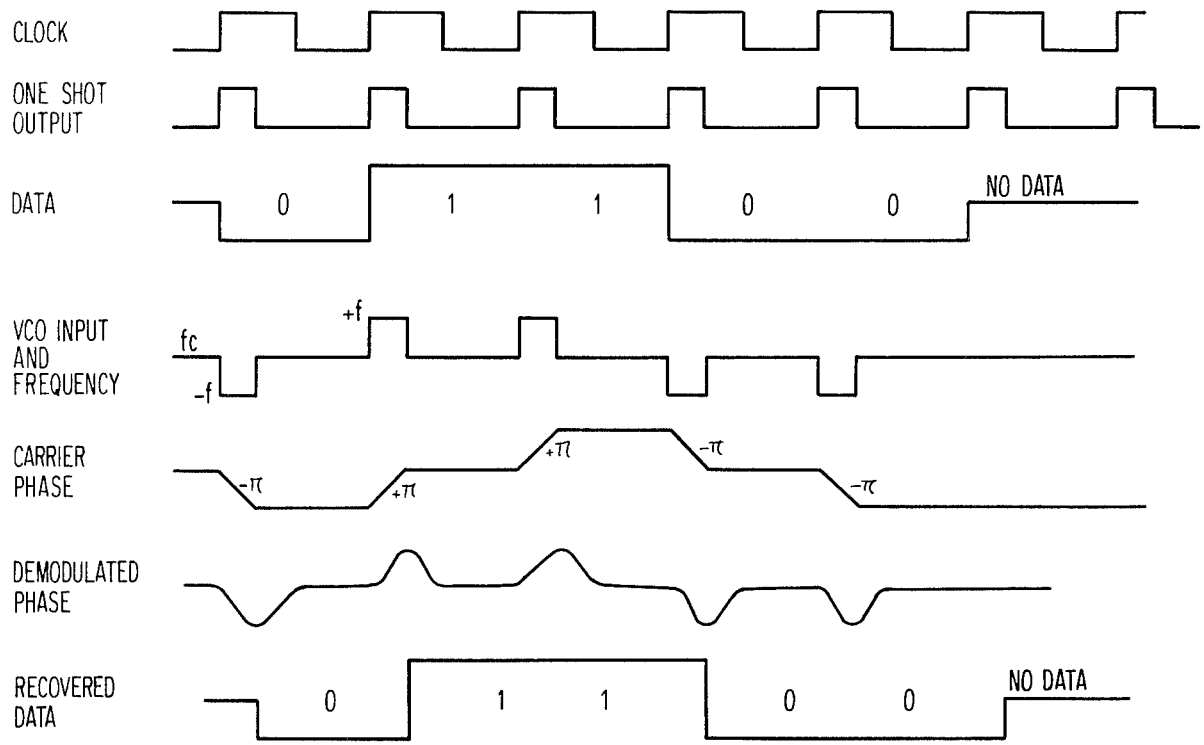
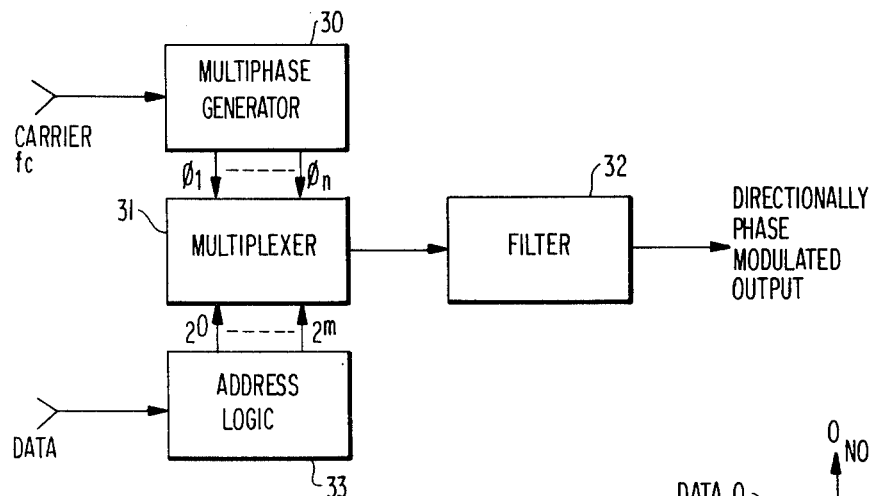
FIG 8
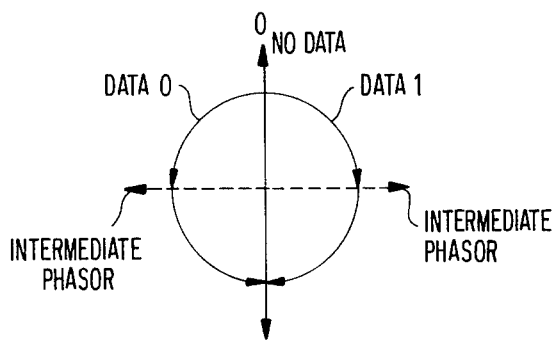
FIG 9B

DELAY LINE DEMODULATOR

LOOP RESPONSE TIME
MUST BE LESS THAN
BIT INTERVAL

PHASE LOCKED
LOOP DEMODULATOR

TIMING DIAGRAM FOR FIG. 8 & 9

DATA DETECTOR

DIRECTIONAL PSK MODULATION AND DEMODULATION SYSTEM

FIELD OF THE INVENTION

The present invention relates to information transmission systems, and more particularly, to phase shift keyed (hereinafter PSK) information transmission systems.

BACKGROUND OF THE INVENTION

The advantages of PSK over AM or FSK have been recognized by the art such that the field of PSK communications is rapidly expanding. Commensurate with the expansion of this field, many varieties of modulation and demodulation have been described in the prior art. These systems have pre-arranged coding and modulation rules to match input information rates with the transmission characteristics of whatever transmission medium is being employed so as to maximize the probability of correct transmission, while, at the same time, minimizing required bandwidth and the effect of noise.

One type of PSK system can be thought of as direct PSK wherein the intelligence to be transmitted is translated into a selected phase with regard to a carrier phase or absolute phase. One difficulty associated with this technique is the requirement that the receiver have information from which it can determine what the carrier phase or absolute phase is at any time so that the received phase may be demodulated to produce the transmitted information.

Another category of PSK systems which does not exhibit this disadvantage is so-called differential PSK. In this arrangement, the information transmitted is encoded as a particular phase with reference to the previously transmitted phase. With this arrangement, the receiver need not have available to it a carrier reference, since the received phase can be demodulated by comparing it with the received phase of the previous modulation level.

Insofar as I am informed, all of these PSK systems, whether they be direct or differential, require two modulation levels for each pair of symbols to be transmitted. Thus, for example, a mark (or 1) will be transmitted by a given phase transition whereas a space (or 0) would be transmitted by a different phase transition. Either one of these phase transitions could, in fact, be no transition.

In order to increase the information capacity of PSK communication systems, arrangements have been provided in the prior art in which multiple modulation levels were available (such as 4). With this scheme, a complex symbol, corresponding to a two bit word, could be transmitted with but a single phase transition. While this increases the rate at which information could be transmitted, nevertheless, in this and other systems, a modulation level was reserved for each symbol transmitted. More particularly, the symbol 01 was transmitted by a particular phase transition or modulation level, whereas the signal 10 was transmitted by a different phase transition or modulation level.

I have found that it is possible to transmit two different symbols with the same phase assignment and thus it is possible using the principles of my invention to provide clocking for each data state and, in addition, a "no-data" state.

It is therefore one object of the present invention to provide a more efficient PSK communication system. It is another object of the present invention to provide a PSK communication system in which two symbols can be transmitted with the same modulation level or phase assignment. It is yet another object of the present invention to achieve the foregoing improvement in efficiency while at the same time not increasing the spectrum bandwidth. It is another object of the present invention to provide a system of the foregoing type which is asynchronous and therefore does not require a clocking signal to be transmitted along with it. It is a further object of the present invention to provide a PSK communication system which is insensitive to data patterns. Finally, it is an object of the invention to meet the foregoing objects with a system exhibiting relative simplicity.

SUMMARY OF THE INVENTION

The present invention meets these and other objects of the invention by providing a directional-PSK communication system in which the information contained in one of two symbols that may be transmitted is transmitted with the identical phase assignment. To prevent ambiguity, one of the two symbols is transmitted by making the phase transition in one direction, and the other symbol is transmitted by making the phase transition in the opposite direction. Thus, for example, a phase transition or modulation level which is $\phi°$ different than the last transmission can be achieved by a phase transition of $+\phi$, or a phase transition of $-\phi$. For each other allowed phase transition or modulation level, two other symbols can be added to the vocabulary. Finally, employing the present invention, the system can also transmit a no data state by omitting a phase transition.

The modulator for the present invention can be implemented in a variety of forms, either employing a VCO or selecting the appropriate phase from a multi-phase generator.

In employing a VCO modulator, the VCO bias is determined by the state (plus, minus or zero) of a bi-polar data signal and the output of a one-shot clocked at the data rate. With the one-shot in the astable state, the state of the data input either advances (for a plus data state) or retards (for a minus data state) the VCO frequency, effecting a phase advancement or retardation. At the conclusion of the astable period, the VCO frequency is returned to its center frequency. The demodulator senses the direction of phase change and produces a corresponding output. The demodulator can take one of a variety of forms, so long as it is sensitive to the direction of phase change.

A digital form of the modulator may be provided with a multi-phase generator and apparatus to select the proper phase output of the multi-phase generator in accordance with the input data. Inasmuch as a single step digital phase shift will not disclose direction information, a digital directional-PSK modulator provides the required phase transition in at least two increments to allow the demodulator to recognize the direction in which phase is changing.

The directional PSK modulation system can be extended to systems which include plural modulation levels by allowing for different rates of phase change and providing a detector or demodulator which is sensitive to the extent of phase change as well as the direction thereof.

In one preferred embodiment of the invention in which only a single modulation level is allowed (which may correspond to a 180° phase shift) the binary symbol 1 can be transmitted by a +180° phase transition, and the binary symbol 0 can be transmitted by a −180° phase transition. This allows the system to transmit a no data state, with no increase in modulation levels by merely failing to provide a phase transition.

In another preferred embodiment of the invention, in which two modulation levels are allowed, 180° and 360°, the symbols 00, 01, 10 and 11 can be transmitted along with a no data state. The symbol 01 is transmitted by a +180° phase transition, the symbol 10 is transmitted by a −180° phase transition, the symbol 00 is transmitted by a −360° phase transition and the symbol 11 is transmitted by a +360° phase transition.

BRIEF DESCRIPTION OF THE DRAWINGS

The present invention will now be described in conjunction with the attached drawings in which like reference characters denote identical apparatus, and in which:

FIG. 7 represents typical waveforms;

FIG. 8 is a block diagram of a directional PSK modulator of the discrete type;

FIGS. 9A, 9B and 9C are a detailed block diagram of the modulator of FIG. 8, the corresponding phasor representation and a representation of the phase transitions produced by the apparatus;

DETAILED DESCRIPTION OF PREFERRED EMBODIMENTS

Figure 1:
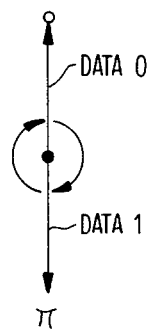
FIG. 1 represents prior art bi-phase PSK.

FIG. 1 illustrates a prior art bi-phase PSK arrangement which can be either direct or differential. For the direct case, the phase transitions illustrated are from a reference carrier, whereas in the differential case, the illustrated phase transitions are with respect to the last transmitted phase. In any event, as shown, a 180° phase transition corresponds to the binary symbol 1, or a mark, whereas the binary symbol 0 (or space) corresponds to the lack of a phase transition.

Figure 2:
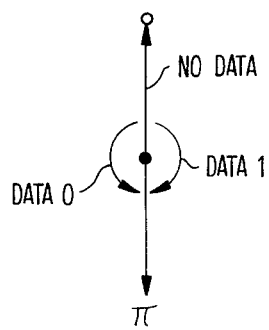
FIGS. 2 and 3 represent directional bi-phase and uni-phase PSK.
Figure 3:
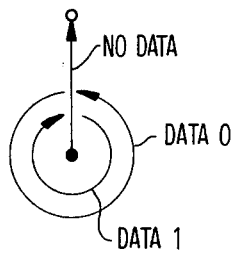

In contrast, FIG. 2 represents a directional bi-phase PSK arrangement in accordance with the principles of the present invention. As shown there, a binary symbol 1 (or mark) is represented by a +180° phase transition, whereas the binary symbol 0 (or space) is represented by a −180° phase transition. An additional information symbol that can be transmitted, with out increasing the number of modulation levels, is a no data state or symbol which is represented by the lack of any phase transition. While FIG. 2 employs a 180° phase transition, it should be understood that the invention can be employed with any selected phase transition (so long as a demodulator can be constructed which is capable of detecting the phase transition). To illustrate the point, FIG. 3 illustrates a uni-phase directional PSK system which has but a single allowed modulation level. In this communication system, binary symbol 1 is represented by a +360° phase transition and the binary symbol 0 is represented by a −360° phase transition. The additional information symbol corresponding to a no data state is again represented by the lack of any phase transition.

The foregoing represents uni-phase and bi-phase directional PSK systems, but after reviewing the present description, those skilled in the art will be able to employ multi-phase directional PSK systems in which more than two modulation levels are employed.

Figure 4:
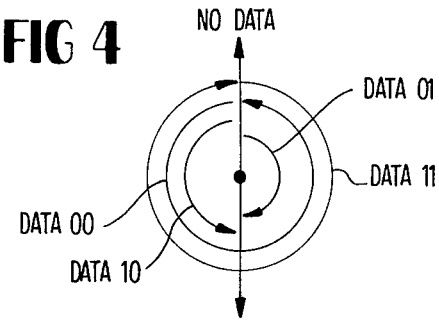
FIG. 4 represents directional bi-phase PSK capable of five modulation levels.

For example, FIG. 4 illustrates another bi-phase directional PSK system which is capable of transmitting, for any phase transition, one of four symbols along with the no data symbol.

Thus, as shown in FIG. 4, the symbol 01 is transmitted by a +180° phase transition, the symbol 10 is transmitted by a −180° phase transition, the symbol 11 is transmitted by a 360° phase transition and the symbol 00 is transmitted by a −360° phase transition. The no data state symbol is transmitted by the lack of any phase transition.

Figure 5:
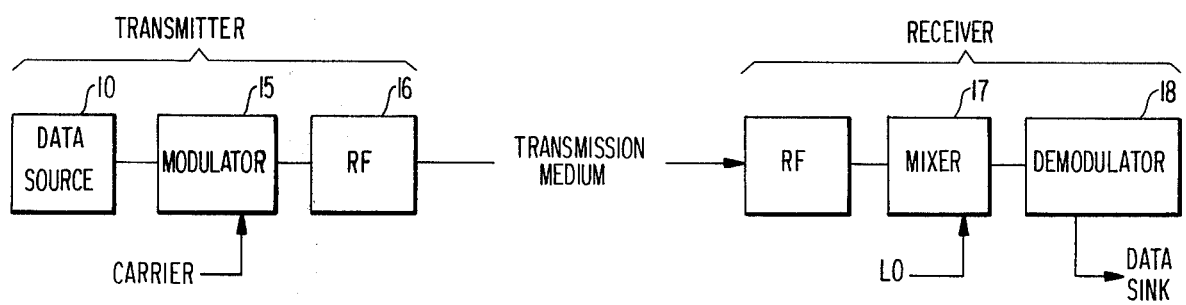
FIG. 5 is a block diagram of a typical communication system.

FIG. 5 is generic to a wide variety of communication systems in which the present invention is applicable. Typically, a data source 10 provides a stream of signals, which may be in binary form, to a modulator representing the information provided by the data source. The modulated carrier may then be stepped up in frequency (if desired) such as by the r-f section 16 to enable it to be transmitted efficiently across any suitable transmission medium. At the receiver, which is coupled to the transmission medium, the received signal may be stepped down to a suitable (for example, intermediate) frequency by a mixer 17 (if the transmitter included an r-f section 16) and then provided to a demodulator 18 which, after recovering the transmitted information, provides it to a data sink. By employing the principles and structure of the invention, an improved modulator and demodulator are provided to thereby increase the efficiency of the communication system illustrated in FIG. 5. The invention is applicable to a wide variety of transmission media such as radiated waves in the atmosphere, wired links either dedicated or through the telephone network, waveguide, etc.

Figure 6:
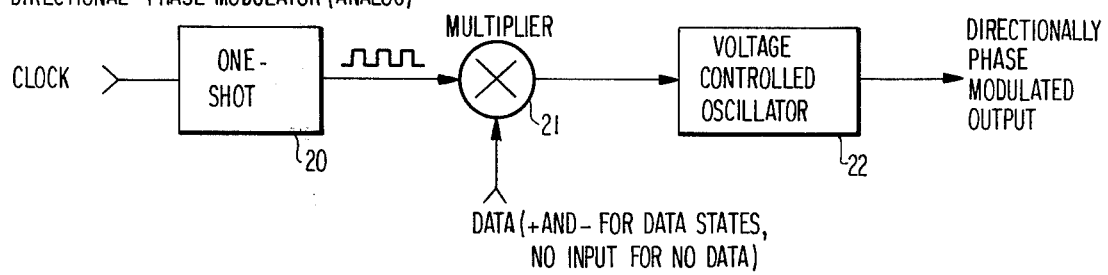
FIG. 6 is a block diagram of a directional-PSK modulator of the continuous type.

As mentioned above, the principles of the present invention can be employed with either discrete or continuous modulation. FIG. 6 discloses apparatus suitable for use with a continuous type modulator.

As shown in FIG. 6, a clock signal, of frequency commensurate with the data rate, and preferably equal thereto, drives a monostable multi-vibrator 20 to produce a pulse train output as shown in the illustration. Preferably the astable period of the one-shot 20 is less than the clock period. The one-shot output is provided to a multiplier 21 which has also provided to it, on another input, a data stream. The multiplier 21 can comprise a conventional analog-multiplier circuit or a double-balanced diode mixer. The modulator of FIG. 6 can be employed for the bi-phase or the uni-phase directional PSK modulation.

In order to effect modulation levels of FIG. 2 or 3, the multiplier 21 output is coupled to a voltage controlled oscillator (hereinafter VCO) 22. In order to provide a phase transition, representative of a mark (or binary 1) the frequency of VCO 22 is increased for a predetermined period. Likewise, in order to provide the phase transition representative of a space (or binary 0) the frequency of VCO 22 is decreased, for a similar period. By properly selecting the nominal frequency of VCO 22, the higher or lower frequency to which it is shifted, and the period during which it is allowed to produce the higher or lower frequency, the desired phase transition can be provided.

In order to effect this operation, multiplier 21 produces an output to bias the VCO 22 during the astable period of the one-shot 20, thereby defining the period during which the frequency of the VCO 22 can be altered. The direction in which the frequency is altered, if it is to be altered, is determined by the other input to the multiplier 21, comprising the data stream. Using a suitable convention (which is not essential to the invention) the binary 1 (or mark) can be represented by a positive voltage which serves to increase the VCO frequency during the astable period of the multi-vibrator. Correspondingly, a space (or 0) can be represented by a negative voltage which will bias the VCO 22 to produce a lower frequency for the astable period of the multi-vibrator. Likewise, the no data state can be represented by a zero voltage state and thereby VCO 22 will produce its nominal frequency output even during the astable period of the multi-vibrator.

Typical waveforms illustrating this operation are shown in FIG. 7. The second and third lines of FIG. 7 represent the input to the multiplier 21, as a function of time comprising the data and one-shot output. The first line shows the clock pulses provided to a one-shot 20. Those skilled in the art will recognize that the portion of the modulator clock pulses which are operative are the transitions and thus, clock waveforms, having other configurations, can be employed so long as an appropriate transition is synchronized with the data stream. As a result of the clock pulses, the one-shot produces a waveform as is illustrated in FIG. 7. During the astable period of the one-shot, the data state is allowed to bias the VCO 22, thereby changing its frequency. Frequency of the VCO 22 is illustrated in FIG. 7 as varying, at selected times, from a nominal level by plus and minus f. As is well known to those skilled in the art frequency is the time rate of change of phase, and accordingly, integrating the frequency excursions will provide a representation of the phase transitions. Thus, the absolute phase of the output of VCO 22 is shown in FIG. 7 with reference to a nominal or reference phase. It is particularly significant to note that the phase transitions occur during the astable period of the multi-vibrator and furthermore are not relatively instantaneous phase transitions, but rather occur gradually. This or the equivalent is required, so that the demodulator can distinguish between two symbols based upon the direction of the phase transition exhibited by the received signal.

FIG. 8 discloses a discrete type directional PSK modulator. As shown in FIG. 8, a multi-phase generator generating phases $\phi_1 \ldots \phi_n$ (where n is at least 2) is driven by a carrier signal which may be of substantially sinusoidal waveform at an appropriate frequency. The various outputs of the multi-phase generator 30 are provided to different inputs of a multiplexer 31. Preferably, multiplexer 31 is enabled to select one of the outputs of generator 30 to provide the selected output to a filter 32. Filter 32 may be either a low pass filter or a bandpass filter, depending on considerations which will be explained below.

In order to select the desired output of the multiplexer 31, address logic 33 is provided. Address logic 33 responds to a data input and in accordance with the signals received over the data input produces an output signal on one or more of its output lines to select the appropriate multiplexer input to be provided to the filter.

Figure 9A:
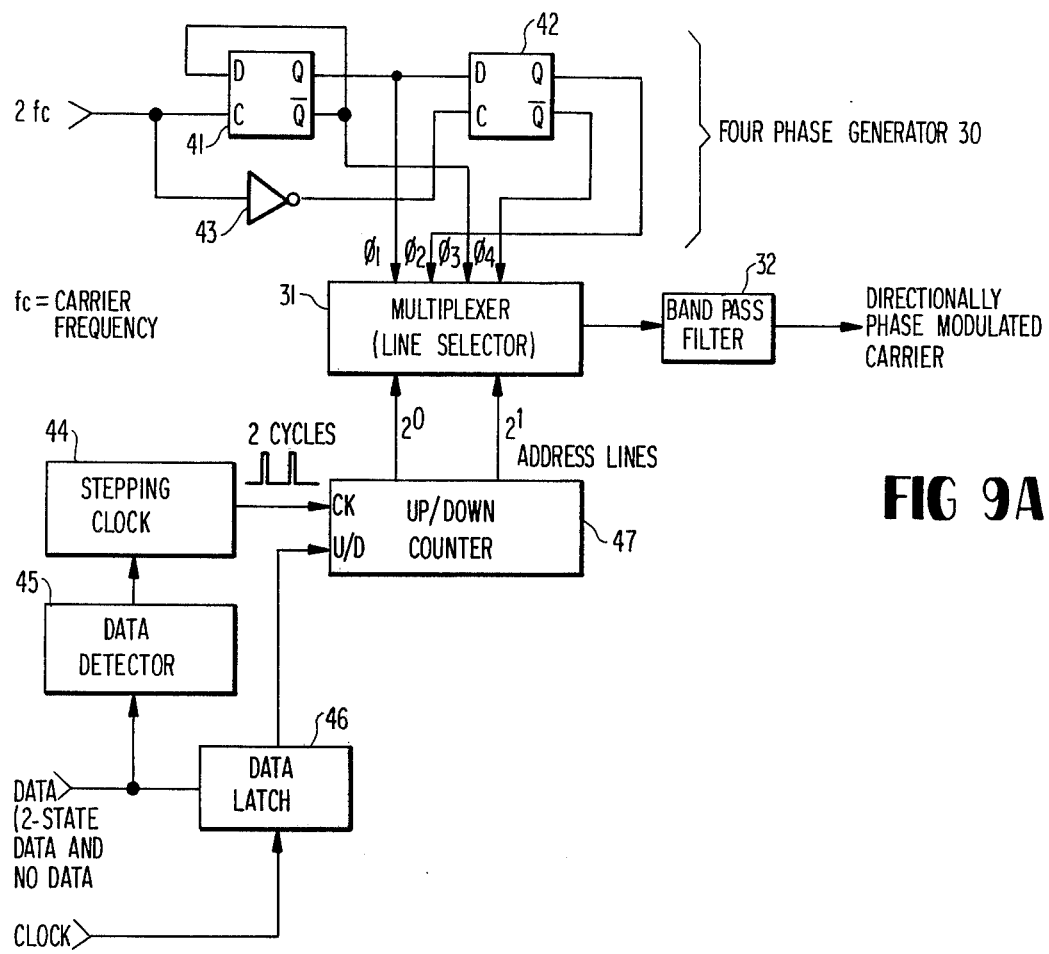
Figure 9C:
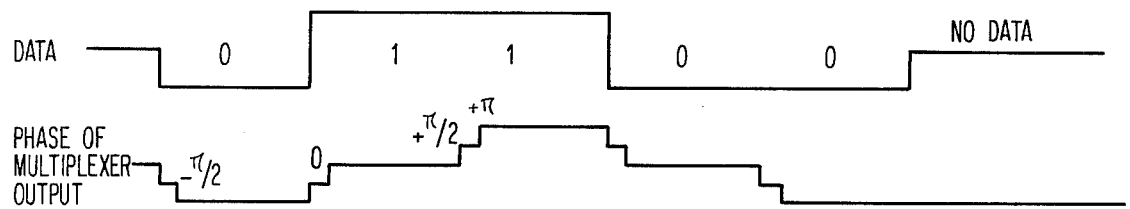

Referring back to FIG. 2, it is apparent that the modulator must provide the carrier with at least two different phases. However, inasmuch as the discrete modulator switches substantially instantaneously from one phase to another, the demodulator could not distinguish between phase transitions in the positive or negative sense. Accordingly, the discrete modulator inserts an intermediate level. Reference is now made to FIGS. 9A, 9B and 9C.

FIG. 9A is a detailed block diagram illustrating a specific implementation of the FIG. 8 block diagram. As illustrated in FIG. 9A, the multi-phase generator 30 comprises a four-phase generator which includes a pair of flip-flops 41 and 42. A clocking signal which is twice the desired carrier frequency clocks flip-flop 41. The Q and $\overline{Q}$ outputs therefore provide signals of the desired carrier frequency phase displaced by 180°. These are coupled to $\phi_1$ and $\phi_3$ inputs, respectively, of the multiplexer 31. An inverter 43 is driven by the same signal which clocks flip-flop 41, and the output of the inverter 43 is provided to clock flip-flop 42. The Q and $\overline{Q}$ outputs are therefore signals at the appropriate frequency and phase displaced from each other by 180°. These are coupled, respectively, to $\phi_2$ and $\phi_4$ inputs of the multiplexer 31. The address logic 33 comprises a stepping clock 44 which produces a pair of pulses each time it receives an input stimulus. The input to the stepping clock is derived from a data detector 45, which is coupled to the modulator data input. The data stream at this terminal may be of bi-polar form as shown in FIG. 7. Accordingly, the data detector 45 may include threshold detectors to determine whether a signal of either polarity is present, and if it is, to energize the stepping clock 44. In a no data state, of course, the data detctor would not energize the stepping clock. The data input to the modulator is also coupled to a data latch 46, which also receives a clocking input. Data from the data stream, after being latched in, is made available by the latch to an up-down counter 47 which can be a modulo 2 counter. The data symbol determines whether or not the counter counts up or down, and the clock pulses from the stepping clock 44 step the clock up or down two counts. The outputs of the up-down counter 47 is provided to the multiplexer to select the appropriate phase to be coupled to the filter 32.

In operation, the two step change in the condition of counter 47 in response to either a mark or a space from the latch 46 provides for a phase transition as is represented in FIG. 9B. Thus, assuming at any time interval a zero phase condition, a data 1 which is to be represented by a +180° phase shift, results in first a +90° phase transition and then a +90° phase transition. Conversely, the symbol 0 produces a −90° phase transition and then an additional −90° phase transition. Thus, the multiplexer output is as is represented in FIG. 9C. That is, assuming the reference phase is being transmitted, in response to a symbol 1 two phase transitions occur, in the positive or advancing direction. A space symbol (data 0) results in two 90° phase transitions in the negative or opposite direction.

From the foregoing, those of ordinary skill in the art will appreciate how the apparatus of FIG. 9A performs the functions specified. The filters are typically bandpass with bandwidth of several times the bit rate. Its purpose is to smooth the stepped phase transition.

Figure 10:
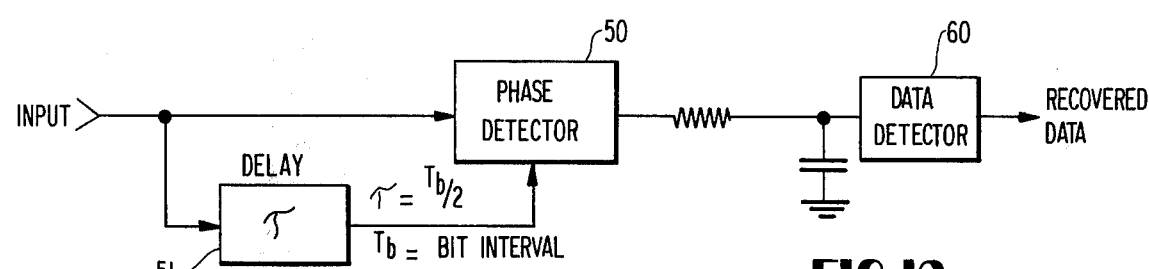
FIGS. 10 and 11 are block diagrams of suitable demodulators.

Demodulation is accomplished by noting the sense of the phase transition which is occurring, or the absence of a phase transition. Thus a phase transition in one direction would correspond to a 1 bit whereas a phase transition in the opposite sense would correspond to a zero bit. Almost any PSK demodulator which is capable of sensing the direction of a phase transition could be employed. FIG. 10 represents one form of a demodulator which employs a delay line and is therefore suitable for differential directional PSK demodulation. As shown, the demodulator input is provided to a phase detector 50 and a delay circuit 51. Preferably, the delay circuit 51 provides a delay equal to one half of the bit interval allowed. Thus, the phase detector compares the phase of one bit interval with the phase occurring at the immediately preceding bit interval. Phase detector 50 produces an output signal whose polarity is dependent upon the relationship between these phases and thus serves to detect the phase transition and the sense thereof. A low pass filter, such as the rc filter illustrated, serves as an envelope detector and thus will produce an output signal of the form shown in FIG. 7 as the detected phase change. This is input to a data detector 60, shown in FIG. 12B.

Figure 11:
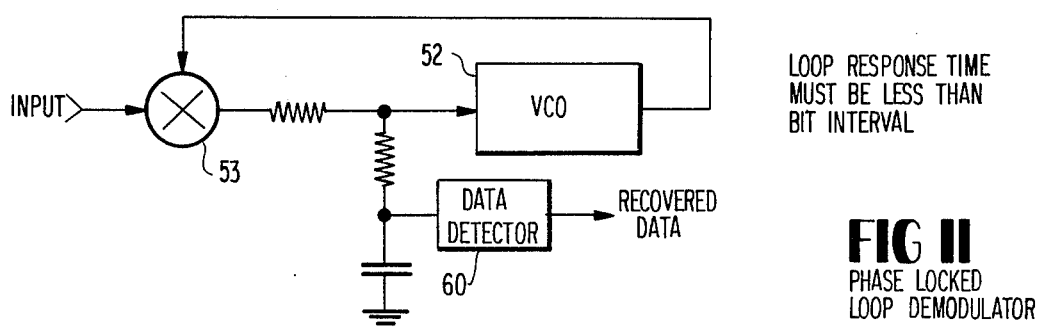
Figure 12A:
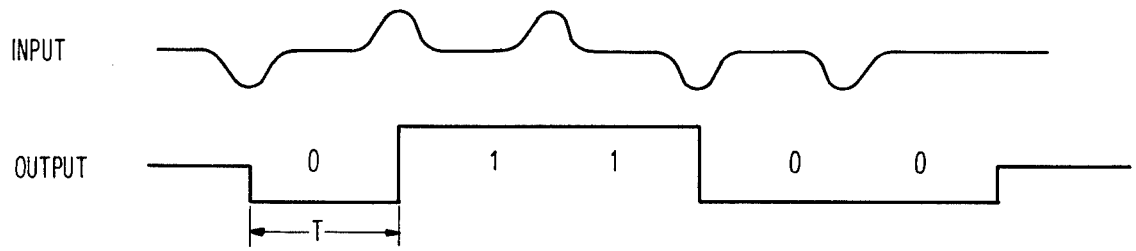
FIGS. 12A and 12B illustrate, respectively, data detector waveforms and a suitable data detector.
Figure 12B:
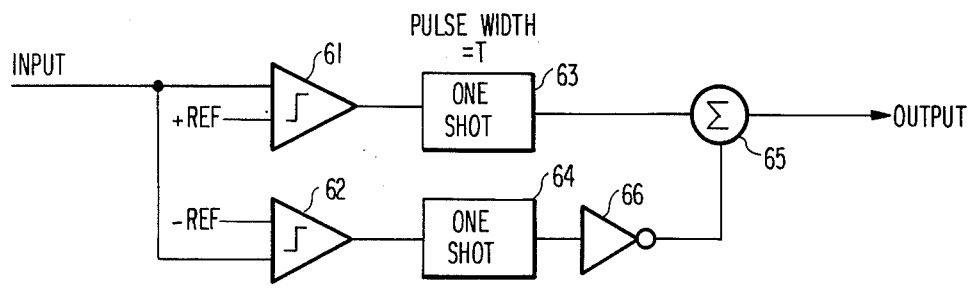

Another form of demodulator is illustrated in FIG. 11. As shown in FIG. 11, a VCO 52 is provided having a nominal frequency corresponding to the carrier frequency. The VCO provides an output to a multiplier 53 which also receives the input to the demodulator. The demodulator output is taken across a similar low pass filter to provide envelope detection function. In this form of the demodulator, which essentially comprises a phase locked loop, the response time of the loop is selected to be less than a bit interval, that is, the loop response time is sufficiently fast to respond to the phase transitions occurring in a period of time less than the bit interval. This type of demodulator will produce an output similar to that shown in FIG. 7, namely, the polarity of the output signal will indicate the sense of the phase transition in the received signal. The output of the demodulator is coupled to data detector 60. FIG. 12A shows, respectively, input and output waveforms of the detector 60. Thus, phase transitions in opposite senses produce pulses of opposite polarity. To convert this waveform back to its original form, the data detector 60 comprises a pair of comparators 61, 62, with different reference levels, each coupled to the demodulator output. Each comparator is coupled to a different one-shot 63, 64, each with identical astable periods T. The output of one is coupled to a summer 65 through an inverter 66, and the output of the other is directly connected thereto. A positive phase transition will cause an output of comparator 61 to trigger one-shot 63 to its astable condition, where it will remain for its astable period T. A negative phase transition will produce the same effect of comparator 62, one-shot 64, but inverter 66 inverts the voltage to produce the bi-polar output shown in FIG. 12A.

Although $\phi$ can be arbitrarily chosen, it must be large enough for the transition to be detected. To provide symmetrical margins for detecting the transitions, $\phi$ is preferably 180° or 360°.

What is claimed is:

1. A directional-PSK communication system with at least one phase assignment in which at least one phase assignment represents either one of two states comprising:

modulation means responsive to a serial stream of digital signals for generating a substantially constant frequency signal with a phase transition associated with each of said digital signals, said modulation means, in response to a digital signal of a first kind producing a phase transition $\phi$ in one direction and, in response to a digital signal of a second kind producing a phase transition $-\phi$ in a direction opposite to said one direction, wherein $\phi$ is 180° or an integer multiple thereof, a transmission channel coupled to said modulation means to transmit said substantially constant frequency signal, and demodulator means coupled to said transmission channel at a location remote from said modulation means and responsive to said phase transitions of said substantially constant frequency signals to produce a first output signal in response to a phase transition in said one direction and a second output signal in response to a phase transition in said opposite direction.

2. The directional PSK system of claim 1 wherein said modulation means responds to a no data condition in said stream of digital signals to omit a phase transition in said substantially constant frequency signal.

3. The directional PSK system of claim 1 wherein $\phi = 180°$.

4. The directional PSK system of claim 1 wherein $\phi = 360°$.

5. The apparatus of claim 1 wherein said modulation means comprises:

a monostable multi-vibrator driven by a clock signal at the rate of receipt of said digital signals, said monostable multi-vibrator having an astable period less than said clock period, a multiplier with two inputs and an output, a one input connected to said multi-vibrator, and a second input provided with said stream of digital signals, and a VCO with an input coupled to said multiplier output.

6. The apparatus of claim 1 wherein said modulation means comprises:

a multi-phase generator capable of generating at least three different phases, a multiplexer having at least as many inputs as phases generated by said multiphase generator and coupled thereto and an output, a control means coupled to and controlling said multiplexer to select the multiplexer input to be presented at said multiplexer output, said control means responsive to said serial stream of digital signals, for selecting a sequence of two of said input phases to be presented to said output in dependence on a particular one of said digital signals.

7. The apparatus of claim 6 wherein said control means includes:

a data latch for storing each digital signal in turn, a data detector for outputting a signal in response to a digital signal of a first or second kind, a stepping clock coupled to said data detector and producing at least two stepping signals in response to a signal from said data detector, a counter controlled to count up or down in response to a digital signal of a first or second kind stored in said data latch and clocked by said stepping signals, an output of said counter coupled to and controlling said multiplexer.

8. The apparatus of claim 1 wherein said demodulation means comprises:

a phase detector with two inputs and an output, one said input responsive to said transmission channel, a delay means with an input responsive to said transmission channel and an output coupled to another input of said phase detector and, data detector means coupled to said phase detector output and providing a digital signal at an output thereof.

9. The apparatus of claim 1 wherein said demodulation means comprises:

multiplying means with two inputs and an output, a one said input responsive to said transmission channel, a VCO with an input coupled to said multiplier output and an output coupled to said another multiplier input, and data detector means responsive to said multiplier output and providing a digital signal at an output thereof.

10. The apparatus of claim 9 wherein a low pass filter is coupled between said multiplier and said data detector means.

11. The apparatus of claim 8 or 10 wherein said data detector means comprises:

a pair of comparator means, each with a reference level, said reference levels of opposite polarity, a pair of monostable multivibrators, each coupled to an output of one of said comparator means, an inverter coupled to an output of one of said astable multivibrators, and summing means with two inputs and an output, one said input coupled to one said monostable multivibrator and another coupled to said inverter.

12. A method of producing a PSK signal in which said PSK signal carries information encoded as the direction of a phase transition comprising the steps of:

providing a carrier of determined frequency, altering said carrier frequency for a predetermined period in one sense or another in response to a data signal of one kind or another to produce a gradual phase transition of $\phi$ in one direction or $-\phi$ in an opposite direction where $\phi$ is 180° or an integer multiple thereof and then returning said carrier frequency to said determined frequency.

13. The method of claim 12 wherein $\phi = 360°$.

14. The method of claim 12 wherein $\phi = 180°$.

15. A method of producing a PSK signal in which said PSK signal carries information encoded as the direction of a phase transition comprising the steps of:

providing at several outputs, several phases of identical frequency, selecting a sequence of at least two phases in response to one or another data signal, said sequence comprising a phase transition of one sense for one data signal or of the opposite sense for said another data signal, and outputting said selected phase sequence.

16. The method of claim 15 in which said sequence of phase transitions corresponds to an advancing or retarding phase transition of $\phi$.

17. The method of claim 16 wherein $\phi = 360°$.

18. The method of claim 16 wherein $\phi = 180°$.

* * * * *